United States Patent [19]
Jödicke et al.

[11] Patent Number: 6,020,423
[45] Date of Patent: *Feb. 1, 2000

[54] CAST RESIN MIXTURE FOR BONDING SUBSTANTIALLY SHEET-SHAPED ELEMENTS

[75] Inventors: Dirk Jödicke; Reinhold Marquardt, both of Gelsenkirchen, Germany; Richard Anders Batchelor, Merseyside, United Kingdom

[73] Assignee: Flachglas Aktiengesellschaft, Fürth, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/442,759

[22] Filed: May 17, 1995

[30] Foreign Application Priority Data

May 17, 1994 [DE] Germany ............... 44 17 220
May 17, 1994 [DE] Germany ............... 44 17 219

[51] Int. Cl.$^7$ .................................. C08K 5/06
[52] U.S. Cl. ............... 524/729; 524/751; 526/328.5
[58] Field of Search ................. 526/328.5, 729, 526/751

[56] References Cited

U.S. PATENT DOCUMENTS

| | | | |
|---|---|---|---|
| 3,617,361 | 11/1971 | Reinhard et al. | 427/208.4 |
| 3,896,074 | 7/1975 | Yamamoto et al. | 526/328.5 |
| 3,989,775 | 11/1976 | Jack et al. | 264/1 |
| 4,384,097 | 5/1983 | Wingler et al. | 526/328.5 |
| 4,564,557 | 1/1986 | Ohgushi et al. | 526/328.5 |
| 5,225,456 | 7/1993 | Langerbeins et al. | 523/201 |
| 5,387,661 | 2/1995 | Frost | 526/90 |
| 5,859,723 | 1/1999 | Jodicke et al. | 359/270 |

FOREIGN PATENT DOCUMENTS

WO 93/14161 7/1993 WIPO ............... C08L 31/02

OTHER PUBLICATIONS

Dr. Otto–Albrech Neumuller, Rompps Chemie–Lexikon 8th revised and extended edition (1981), and English translation of pertinent portion thereof, p. 1476.
Kunststoff–Handbuch vol. IX Polymethacyrlates Production, characteristics, process and application 1975, and English translation of pertinent portion thereof, pp. 45–46.
DIN 16945 and English translation of pertinent portion thereof p. 292, Jun. 1969.

*Primary Examiner*—Bernard Lipman
*Attorney, Agent, or Firm*—Sughrue, Mion, Zinn, Macpeak & Seas, PLLC

[57] ABSTRACT

The invention relates to a cast resin mixture for bonding substantially sheet-shaped elements, such as glass pane or the like, with a content of at least one non-functionalized acrylic and/or methacrylic ester and at least one functionalized alkyl ester of (meth)acrylic acid, optionally at least one plasticizer, optionally at least one cross-linking agent, optionally at least one primer and optionally at least one polymerization initiator. To improve this cast resin mixture in versatility of use and ease of handling, and to allow glass panes and the like to be bonded to one another reliably and durably, while optionally embedding function elements the acrylic and/or methacrylic ester(s) comprise(s) at least one constituent from the following group: all branched and unbranched saturated aliphatic (meth)acrylic esters, in particular methyl-, ethyl-, n-propyl-, iso-propyl-, n-butyl-, iso-butyl-, sec-butyl-, tert-butyl- and 2-ethyl-1-hexyl-(meth) acrylic esters. At least one functionalized alkyl ester of acrylic or methacrylic acid in the ester group includes at least one hydroxy- or amino- and/or epoxy-function, where the alkyl chains are saturated branched or saturated unbranched.

25 Claims, No Drawings

CAST RESIN MIXTURE FOR BONDING SUBSTANTIALLY SHEET-SHAPED ELEMENTS

SPECIFICAITON

The invention relates to a cast resin mixture for bonding substantially sheet-shaped elements, such as glass panes or the like, with a content of at least one non-functionalized aliphatic acrylic or methacrylic ester and at least one functionalized alkyl ester of (meth)acrylic acid, optionally at least one plasticizer, optionally at least one cross-linking agent, optionally at least one primer and optionally at least one polymerization initiator, as well as its use.

For numerous applications, for example for embedding solar cells for the production of solar modules or for production of the ion conducting layer of electrochromic pane arrangements, as are known from EP-B 0 083 988, but also for production of laminated safety glass panes, cast resin mixtures are desirable which, with greater ease of handling, evidence good durability with permanently high light transmission and are suitable for reliable bonding of components, such as glass panes and the like, delimiting a pane interspace or the like which should be filled by the cast resin mixture.

From fact a series of publications, such as DE-B 22 23 046, DE-B 24 16 991, DE-C 25 36 312 and DE-B 26 06 569 for example, cast resin mixtures or layers made thereof are known which as the principal components incorporate at least one non-functionalized acrylic or methacrylic ester and at least one functionalized alkyl ester of acrylic or methacrylic acid with at least one hydroxy or amino function in the ester group, where however provision is made for other components—in the case of with DE-B 22 23 046 a secondary or tertiary amine salt of an ethylene/acrylic acid mixture of polymers, in the case of DE-B 24 16 991 a titanium alkoxy compound, and in the case of DE-B 26 06 569 chaining agents containing acrylic acid and mercapto groups, in the case of DE-C 25 36 312 an additional mixture of polymers—which are not ideally suited for bonding glass panes, in particular embedding additional elements to be located between the glass panes, such as solar cells or the like.

It is the object of the invention to develop a cast resin mixture of the generic type which is already known for the production of laminated safety glass panes such that, with versatility of use and ease of handling, glass panes and the like can be bonded to one another reliably and durably, while optionally embedding function elements.

This problem is solved by the invention by the acrylic/and or methacrylic ester(s) comprising at least one constituent from the following group: all branched and unbranched saturated aliphatic (meth)acrylic esters, in particular methyl-, ethyl-, n-propyl-, n-butyl-, iso-propyl-, iso-butyl-, sec-butyl-, tert-butyl-and 2-ethyl-1-hexyl-(meth)acrylic esters; and that the at least one functionalized alkyl ester of acrylic or methacrylic acid in the ester group incorporates at least one hydroxy-, amino- and/or epoxy-function, where the alkyl chains are saturated branched or unbranched.

Here, provision can be made for the proportion of non-functionalized aliphatic (meth)acrylic esters to be between 60 and 99 mol %.

The invention also provides for the proportion of non-functionalized aliphatic (meth)acrylic esters to be between 70 and 90 mol %.

Provision can also be made for the hydroxyalkyl ester(s) to be selected from the group comprising 2-hydroxyethyl acrylate, 1-hydroxypropyl acrylate, 2-hydroxypropyl acrylate, 1,4-butanediol monoacrylate and 1,6-hexanediol monoacrylate The invention also provides for the aminoalkyl ester(s) to be selected from the group comprising dimethylaminoethyl acrylate, diethylaminoethyl acrylate and tert-butylaminoethyl acrylate.

It is preferred that said epoxyalkyl ester of acrylic or methacrylic acid is 2,3-epoxypropyl acrylate or 2,3-epoxypropyl methacrylate.

Provision can also be made for the at least one functionalized alkyl ester of acrylic or methacrylic acid which in the ester group to contain at least one hydroxy or amino function, additionally incorporating at least one further ester or amide function, where the alkyl chains are saturated branched or unbranched.

Furthermore provision can be made for the ester of acrylic or methacrylic acid which incorporates a hydroxy function and an additional ester function to be formed by formal condensation of a hydroxyalkyl acrylate with a lactone.

Furthermore the invention provides for hydroxyalkyl acrylate to be selected from the group comprising 2-hydroxyethyl acrylate, 1-hydroxypropyl acrylate, 2-hydroxypropyl acrylate, 1,4-butanediol monoacrylate or 1,6-hexanediol monoacrylate.

Provision can also be made for the lactone to be selected from the group of 4-, 5-, 6- or 7-membered ring lactones, such as β-butyrolactone, γ- or δ-valerolactone, γ-, δ- or ε-caprolactone.

Here, provision can be made for the ester of acrylic or methacrylic acid which incorporates a hydroxy function and an additional ester function to be formed by formal condensation of an hydroxyalkylacrylate with a lacton, for example from a) 2-hydroxyethyl acrylate with ε-caprolactone resulting in 6-hydroxy-2'- [(1-oxo-2-propenyl) -oxy]-caproic acid ethylester, or b) 1,4-butanediol monoacrylate with δ-valerolactone resulting in 5-hydroxy-4'-[(1-oxo-2-propenyl) -oxy]-butyric acid butylester.

The aforementioned component a) is represented by graphic formula as follows:

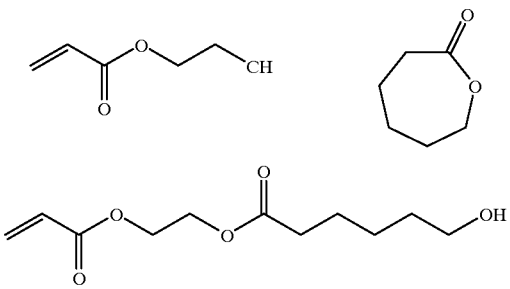

2-hydroxyethyl acrylate+ε-caprolactone=>6-hydroxy-2'-[(1-oxo-2-propenyl)-oxy]-caproic acid ethylester The aforementioned component b) can be represented by graphic formula as follows:

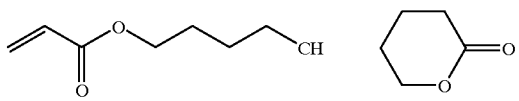

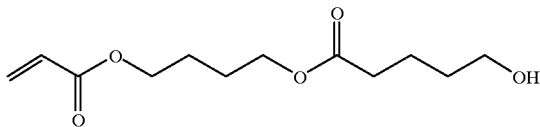

1,4-butanediol monoacrylate+δ-valerolactone≧5-hydroxy-4'-[(1-oxo-2-propenyl) -oxy]-butyric acid butylester A preferred embodiment provides that 2,3-epoxypropyl acrylate or 2,3-epoxypropyl methacrylate is used together with an ester of acrylic or methacrylic acid which includes a hydroxy function and an additional ester function which can be formed by formal condensation of a hydroxy alkyl acrylate with a lactone, for example from a) 2-hydroxyethyl acrylate with ε-caprblactone resulting in 6-hydroxy-2'-[(1-oxo-2-propenyl)-oxy]-caproic acid ethyl ester, or b) 1,4-butanediol monoacrylate with δ-valerolactone resulting in 5-hydroxy-4'- [(1-oxo-2-propenyl) -oxy]-butyric acid butylester.

Furthermore, the invention provides for the ester of the acrylic or methacrylic acid which incorporates an amino function and an additional ester function to be formed by formal condensation of a hydroxyalkyl acrylate with a lactam.

Provision can be made for the hydroxyalkyl acrylate to be selected from the group comprising 2-hydroxyethyl acrylate, 1-hydroxypropyl acrylate, 2-hydroxypropyl acrylate, 1,4-butanediol monoacrylate or 1,6-hexanediol monoacrylate.

The invention also proposes that the lactam be selected from the group comprising 4-, 5-, 6- or 7-membered ring lactams, such as β-propiolactam, β- or γ-butyrolactam, γ- or δ-valerolactam and/or γ-, δ- and/or ε-caprolactam.

Provision can also be made for the ester of the acrylic or methacrylic acid to incorporate an amino function and an additional ester function, can be formed, by formal condensation of a hydroxyalkyl acrylate with a lactam, for example from a) 2-hydroxyethyl acrylate with ε-caprolactam resulting in 6-amino-2'-[(1-oxo-2-propenyl)-oxyl]-caproic acid ethylester, or of b) 1,4-butanediol monoacrylate or with δ-valerolactam resulting in 5-amino-4'[(1-oxo-2-propenyl) -oxy]-butyric acid butylester.

The aforementioned component a) can be represented by graphic formula as follows:

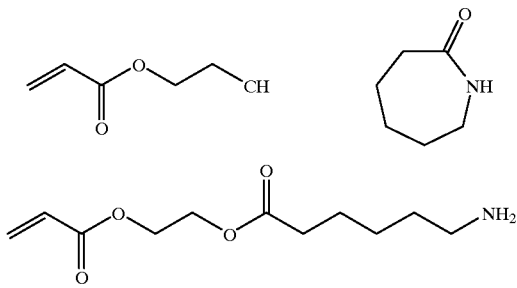

2-hydroxyethyl acrylate+ε-caprolactam≧6-amino-2'-[(1-oxo-2-propenyl)-oxyl]-caproic acid ethylester The aforementioned component b) can be represented by graphic formula as follows:

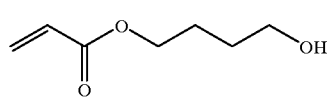 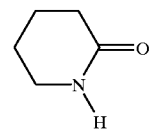

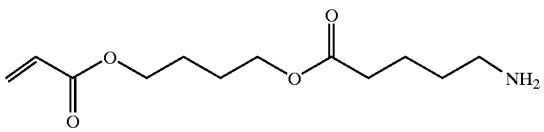

1,4-butanediol monoacrylate+δ-valerolactam≧5-amino-4'-[(1-oxo-2-propenyl)-oxy]-butyric acid butylester Provision can also be made for the ester of the acrylic or methacrylic acid which incorporates a hydroxy function and an additional amide function can be formed by formal condensation of an aminoalkyl acrylate with a lactone.

Furthermore, the invention provides for the aminoalkyl acrylate to contain a primary or secondary amino group and to be selected from the group comprising 2-aminoethyl acrylate, 3-aminopropyl acrylate, 4-aminobutyl acrylate, 2-methylaminoethyl acrylate or 2-ethylaminoethyl acrylate.

Provision can be made for the lactone being selected from the group comprising 4-, 5-, 6- or 7-membered ring lactones, such as β-propylactone, β- or γ-butyrolactone, γ- or δ-valerolactone, γ-, δ- and/or ε-caprolactone.

The invention also proposes that the ester of the acrylic or methacrylic acid which incorporates a hydroxy function and an additional amide function can be formed by formal condensation of an amino alkyl acrylate with a lactone, for exampld from a) 2-aminoethyl acrylate with ε-caprolactone resulting in 6-hydroxy-2'-[(1-oxo-2-propenyl)-oxy]-caproic acid ethyl amide, or from b) 4-aminobutyl acrylate with δ-valerolactone resulting in 5-hydroxy-4'-[(1-oxo-2-propenyl)-oxy]-butyric acid butylamide.

The aforementioned component a) can be represented by graphic formxula as follows:

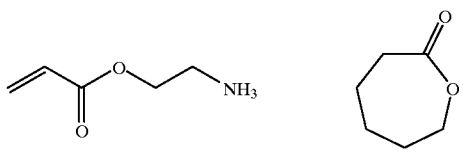

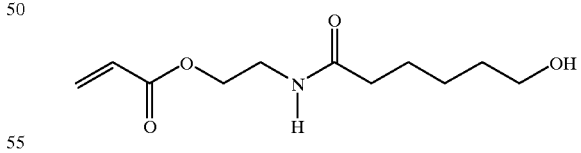

2-aminoethyl acrylate+ε-caprolactone≧6-hydroxy-2'-[(1-oxo-2-propenyl)-oxy]-caproic acid ethylamide The aforementioned component b) can be represented by graphic formula as follows:

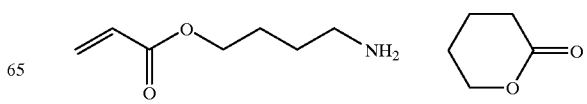

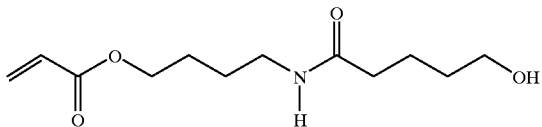

4-aminobutyl acrylate+δ-valerolactone≧5-hydroxy-4'-[(1-oxo-2-propenyl)-oxy]-butyric acid butylamide Preferably, 2,3-epoxypropyl acrylate or 2,3-epoxypropyl methacrylate is used together with an ester of acrylic or methacrylic acid which includes a hydroxy function and an additional amide function which can be formed by formal condensation of a amino alkyl acrylate with a lactone, for example from a) 2-aminoethyl acrylate with ε-caprolactone resulting in 6-hydroxy-2'- [(1-oxo-2-propenyl) -oxy]-caproic acid ethyl ester, or from b) 4-aminobutyl acrylate with δ-valerolactone resulting in 5-hydroxy-4'-[(1-oxo-2-propenyl)-oxy]-butyric acid butylamide.

Provision can also be made for the proportion of functionalized alkyl ester of the acrylic or methacrylic acid to be 0.5 to 30 mol %.

The invention also proposes that the proportion of functionalized alkyl ester of the acrylic or methacrylic acid is 5 to 25 mol %.

The invention also proposes that the plasticizer(s) be selected from the group comprising propylene carbonate, ethylene carbonate, γ-butyrolactone, N-methyl-pyrrolidone, 1,3-dimethyl-2-imidazolidinone, 3-methyl-2-oxazolidinone, dimethyl formamide, dimethyl sulphoxide, dimethoxyethane and diethylene glycol monomethylether, as well as mixture of at least two of the aforementioned materials.

Provision can also be made for the proportion of plasticizer(s) to be up to 30 mol %.

Provision be made thereby for the proportion of plasticizer(s) to be a maximum of 25 mol %.

Preferably, said plasticizer is selected from the group consisting of primary, secondary and/or tertiary alcohols carrying at least one OH group and mixtures thereof.

The invention is further characterized in that said alcohol is selected from the group consisting of primary, secondary and/or tertiary aliphatic alcohols which are branched or unbranched and mixtures thereof. Examples are methanol, ethanol, 1-propanol, 2-propanol, 1-butanol, 2-butanol, secbutyl alcohol, tert-butyl alcohol and higher homologues and mixtures thereof.

The invention is also characterized in that said alcohol is selected from the group consisting of branched or uibranched diols, triols and alcohols comprising more than three OH groups and mixtures thereof. Examples are ethylene glycol, diethylene glycol, triethylene glycol, tetraethylene glycol, propylene glycol, dipropylene glycol, tripropylene glycol, tetrapropylene glycol, 1,4-butane diol, 2,3-butane diol, 1,5-pentane diol, 1,6-hexane diol, 1,2,3-propane triol, trimethylol propane, pentaerythritol or the like and mixtures thereof.

Finally, the invention is characterized in that said alcohol is selected from the group consisting of saturated cyclic primary, secondary and/or tertiary alcohols and mixtures thereof. Examples are cyclopropanol, cyclobutanol, cyclopentanol, cyclohexanol, 1-cyclopropylethanol or the like and mixtures thereof.

The proportion of primary, secondary and/or tertiary alcohols carrying at least one OH group should be 0.01 to 5 mol %.

Provision can also be made thereby for the cross-linking agent(s) to incorporate at least one compound which possesses at least two acrylate or methacrylate groups per molecule, such as 1,4-butanediol diacrylate, 1,6-hexanediol diacrylate, ethylene glycol diacrylate, di-ethylene glycol diacrylate. tri-ethylene glycol diacrylate, propylene glycol diacrylate, di-propylene glycol diacrylate, tri-propylene glycol diacrylate, trimethylol propane triacrylate, ditrimethylol propane tetraacrylate, dipentaerythritol pentaacrylate and/or pentaerythritol tetraacrylate.

The invention also proposes that the proportion of cross-linking agent be up to 10 mol %.

The invention is furthermore characterized in that the proportion of cross-linking agent(s) be of 5 mol % at maximum.

The invention can also be characterized in that the polymerization initiator proportion is 0.01 to 0.5 mol %.

The invention can also be characterized in that the polymerization initiator proportion is 0.02 to 0.15 mol %.

The invention can further be characterized in that said polymerization initiator is capable of initiating UV curing said cast resin mixture.

The invention proposes that the polymerization initiator(s) be selected from the group incorporating hydroxycyclohexylphenylketone, 2-hydroxy-2-methylphenyl-1-propanone, 2,4,6-trimethylbenzoyldiphenyl phosphine oxide and/or ethyl-2,4,6-trimethylbenzoylphenylphosphinate.

The invention is also characterized by a proportion of at least one primer of up to 5.00 mol %.

The invention also makes provision for the proportion of the primer to be up to 2.00 mol %.

The invention proposes that the primer be a silane.

The invention is also characterized in that vinyl-tris(2-methoxy-ethoxy) silane, 3-acryloxypropyl-trimethoxysilane or 3-methacryloxypropyl-trimethoxysilane be used as silane.

The subject of the invention is furthermore the use of the cast resin mixture for establishment of the ion conducting layer of an electrochromic pane arrangement or the like.

Furthermore, the object of the invention is also the use of the cast resin mixture for embedding solar cells located between (glass) panes.

Furthermore, the invention is also suitable for the production of laminated safety glass pane for vehicle or architectural glazing.

Furthermore, the subject of the invention is also the use of the cast resin mixture for the production of laminated glass panes with at least one individual plastic pane.

Furthermore, the invention is also suitable for use for establishing a matrix for inorganic or organic redox systems, such as iodine/iodide.

Finally, the subject of the invention is also the use of the cast resin mixture according to the invention as a matrix for acid or base-sensitive pigments or the like.

The cast resin mixture according to the invention is therefore suitable in particular for embedding solar cells, as matrix for salts soluble in organic media, for example alkali salts, where, after addition of plasticizers, one obtains ionically conductive cast resins for electrochromic panes, as is the subject of German Patent Application P 44 17 220.6 of the same Application Date, and can be used as matrix for inorganic and organic redox systems, for example iodine/iodide, where such mixtures can be used as tonically conductive polymers with redox properties, with ionic conduction for both positive and negative charges. Tonically conductive redox polymer systems of this type are used in photoelectric cells. The cast resin mixture according to the invention can also be used for establishment of a plastic layer between two sheets, at least one of which is transparent, where the sheets can be of glass of other materials. Finally, attention should be drawn as an application for the cast resin mixture according to the invention to the establishment of a matrix for acid or base-sensitive pigments for the production of coloured glasses, glass infill panels, curtain wall elements or the like.

Further advantages of the invention are stated in the Specification below, in which embodiments are described in detail:

EXAMPLE 1

A cast resin mixture according to the invention is made up from 90 g corresponding to 86.45 weight % or 89.11 mol % n-butyl acrylate, 10 g corresponding to 9.61 weight % or 8.80 mol % 1,4-butanediol monoacrylate, 2 g corresponding to 1.92 weight % or 0.90 mol % silane (vinyl-tris(2-methoxy-ethoxy) silane) as primer, 2 g corresponding to 1.92 weight % or 1.12 mol % 1,6-hexanediol diacrylate as cross-linking agent and 0.10 g corresponding to 0.10 weight % or 0.06 mol % polymerization initiator and used for production of solar modules with solar cells arranged between glass panes.

As polymerization initiator is used a substance available under the trade name Darocure 4263, consisting of 70% Irgacure 1173 and 30% Lucirin TPO. The substance available under the trade name Irgacure 1173 is 2-hydroxy-2-methylphenyl-1-propanone; that available under the trade name Lucirin TPO is 2,4,6-trimethylbenzoyldiphenyl phosphine oxide. Other especially suitable polymerization initiators according to the invention are a substance available under the trade name Irgacure 184, chemical name hydroxy-cyclohexyl phenyl ketone, a substance available under the trade name Darocure 4265, consisting of 50% Irgacure 1173 and 50% Lucirin TPO. Especially preferred is the use of either Darocure 4263 or Irgacure 184. Altogether, the cast resin mixture according to the invention described above consists in the case of the embodiment dealt with here of the following:

| Substance | mass [g] | weight % | mol % |
| --- | --- | --- | --- |
| n-butyl acrylate | 90 | 86.45 | 89.11 |
| 1,4-butanediol monoacrylate | 10 | 9.61 | 8.80 |
| primer (silane) | 2 | 1.92 | 0.90 |
| 1,6-hexanediol diacrylate | 2 | 1.92 | 1.12 |
| initiator (Darocure 4263) | 0.10 | 0.10 | 0.06 |

EXAMPLE 2

A cast resin mixture according to the invention is made up from 95 g corresponding to 89.45 weight % or 93.13 mol % n-butyl acrylate, 5.0 g corresponding to 4.71 weight % or 4.39 mol % dimethylaminoethyl acrylate, 2.0 g corresponding to 1.88 weight % or 0.89 mol % silane (vinyl-tris(2-methoxy-ethoxy) silane), 4.0 g corresponding to 3.77 weight % or 1.49 mol % tri-methylol propane triacrylate and 0.20 corresponding to 0.19 weight % or 0.09 mol % polymerization initiator and is used for production of solar modules with solar cells located between glass panes.

In tabular form therefore, the cast resin mixture described above has the following composition:

| Substance | mass [g] | weight % | mol % |
| --- | --- | --- | --- |
| n-butyl acrylate | 95 | 89.45 | 93.13 |
| diethylaminoethyl acrylate | 5.0 | 4.71 | 4.39 |
| primer (silane) | 2.0 | 1.88 | 0.89 |
| trimethylol propane triacrylate | 4.0 | 3.77 | 1.49 |
| initiator (Darocure 4263) | 0.20 | 0.19 | 0.09 |

EXAMPLE 3

A further cast resin mixture for production of solar modules with solar cells located between glass panes is composed as follows:

| Substance | mass [g] | weight % | mol % |
| --- | --- | --- | --- |
| n-butyl acrylate | 50.0 | 48.23 | 54.77 |
| 2-ethylhexyl acrylate | 20.0 | 19.37 | 15.30 |
| 6-hydroxy-2"-[(1-oxo-2-propenyl)-oxy]-caproic acid ethylester | 10.0 | 9.69 | 6.12 |
| 1,4-butanediol monoacrylate | 10.0 | 9.69 | 9.78 |
| di-propylene glycol diacrylate | 4.0 | 3.87 | 2.32 |
| propylene carbonate | 3.0 | 2.91 | 4.15 |
| ethylene carbonate | 4.0 | 3.87 | 6.40 |
| primer (Silane GF 58) | 2.0 | 1.94 | 1.01 |
| initiator (Darocure 4263) | 0.25 | 0.24 | 0.16 |

EXAMPLE 4

A further cast resin mixture for the production of an ion conducting layer for an electrochromic pane system corresponding to Patent Application P 44 17 220.6 is composed as follows:

| Substance | mass [g] | weight % | mol % |
| --- | --- | --- | --- |
| n-butyl acrylate | 983 | 78.55 | 76.21 |
| 1,4-butanediol monoacrylate | 24 | 1.92 | 1.66 |
| propylene carbonate | 185 | 14.78 | 17.99 |
| lithium perchlorate | 33 | 2.64 | 3.08 |
| lithium bromide | 1.2 | 0.10 | 0.14 |
| tripropylene glycol diacrylate | 24 | 1.92 | 0.86 |
| initiator (Darocure 4263) | 1.3 | 0.10 | 0.06 |

As silane, which can preferably be used as primer in the case of the cast resin mixture according to the inventions particularly suitable is vinyl-tris(2-methoxy-ethoxy) silane, which can be obtained under the trade name Silane GP 58 from Wacker-Chemie GmbH or Dynasilane VTMOEO from Hüls AG.

In the following, examples are given which use special alcohols as plasticizers.

EXAMPLE 5

235 g corresponding to 77.48 weight % or 74.50 mol % n-butyl acrylate, 10 g corresponding to 3.30 weight % or 2.82 mol % 1,4-butanediol monoacrylate, 45 g corresponding to 14.84 weight % or 17.91 mol % propylene carbonate, 3 g corresponding to 1.00 weight % or 0.92 mol % trimethylol propane, 10 g corresponding to 3.30 weight % or 3.81 mol % lithium perchlorate, and 0.3 g corresponding to 0.10 weight % or 0.04 mol % polymerization initiator, namely 2,4,6-trimethylbenzoyl diphenyl phosphine oxide, acting as UV initiator.

Finally, two embodiments of the present invention are illustrated in which the substance 2,3-epoxypropyl acrylate is used.

EXAMPLE 6

85 g corresponding to 83.25 weight % or 83.80 mol % n-butyl acrylate, 10 g corresponding to 9.79 weight % or 10.81 mol % hydroxyethyl acrylate, 5 g corresponding to 4.90 weight % or 4.90 mol % 2,3-epoxypropyl acrylate, 2 g corresponding to 1.9weight % or 0.95 mol % 3-methacryloxypropyl trimethoxysilane, and 0.1 g corresponding to 0.10 weight % or 0.04 mol % polymerization initiator, namely 2,4,6-trimethylbenzoyl diphenyl phosphine oxide, acting as UV initiator.

EXAMPLE 7

60 g corresponding to 58.77 weight % or 61.43 mol % n-butyl acrylate, 20 g corresponding to 19.59 weight % or 20.48 mol % tert-butyl acrylate, 10 g corresponding to 9.79 weight % or 9.10 mol % 1,4 butandiolmonoacrylate, 5 g corresponding to 4.90 weight % or 5.12 mol % 2,3-epoxypropyl acrylate, 5 g corresponding to 4.90 weight % or 2.85 mol % 6-hydroxy-2'-[(1-oxo-2-propenyl)-oxy]-caproic acid ethylester, 2 g corresponding to 1.96 weight % or 0.99 mol % 3-methacryloxypropyl trimethoxysilane, and 0.1 g corresponding to 0.10 weight % or 0.04 mol % polymerization initiator, namely 2,4,6-trimethylbenzoyl diphenyl phosphine oxide, acting as UV initiator.

The features of the invention disclosed in the above Specification, as well as in the claims, can be essential both individually and also in any combination for implementation of the invention in its various embodiments.

We claim:

1. Cast resin mixture for bonding substantially sheet-shaped elements, said mixture comprising at least one non-functionalized acrylic and/or methacrylic ester and at least one functionalized alkyl ester of (meth)acrylic acid, at least one plasticizer, optionally at least one cross-linking agent, optionally at least one primer and optionally at least one polymerization initiator, wherein said acrylic and/or methacrylic ester comprises at least one branched or unbranched saturated aliphatic (meth)acrylic ester, said functionalized alkyl ester of acrylic or methacrylic acid in the ester group comprises at least one hydroxy-, amino- or epoxy-group, wherein the alkyl chains are saturated branched or saturated unbranched, and wherein said plasticizer is selected from the group consisting of propylene carbonate, ethylene carbonate, γ-butyrolactone, 1,3-dimethyl-2-imidazolidinone, 3-methyl-2-oxazolidinone, dimethylformamide, dimethyl sulphoxide, dimethoxyethane, diethylene glycol monomethylether, and a mixture of at least two of said plasticizers.

2. Cast resin mixture in accordance with claim 1, characterized in that the proportion of non-functionalized aliphatic (meth)acrylic esters is between 60 and 99 mol %.

3. Cast resin mixture in accordance with claim 2, characterized in that the proportion of non-functionalized aliphatic (meth)acrylic esters is between 70 and 90 mol %.

4. Cast resin mixture in accordance with claim 1, characterized in that the hydroxyalkyl ester(s) is/are selected from the group consisting of 2-hydroxethyl acrylate, 1-hydroxypropyl acrylate, 2-hydroxypropyl acrylate, 1,4-butanediol monoacrylate and 1,6-hexanediol monoacrylate.

5. Cast resin mixture according to claim 1, wherein said at least one functionalized alkyl ester is an aminoalkyl ester selected from the group consisting of dimethylaminoethyl acrylate, diethylaminoethyl acrylate and tert-butylaminoethyl acrylate.

6. Cast resin mixture according to claim 1 wherein said functionalized alkyl ester is an epoxyalkyl ester and said epoxyalkyl ester of acrylic or methacrylic acid is 2,3-epoxypropyl acrylate or 2,3-epoxypropyl methacrylate.

7. Cast resin mixture in accordance with claim 1, characterized in that the proportion of functionalized alkyl ester of the acrylic or methacrylic acid is 0.5 to 30 mol %.

8. Cast resin mixture in accordance with claim 1, characterized in that the proportion of functionalized alkyl ester of the acrylic or methacrylic acid is 5 to 25 mol %.

9. Cast resin mixture in accordance claim 1, characterized in that the proportion of plasticizer(s) is up to 30 mol %.

10. Cast resin mixture in accordance with claim 9, characterized in that the proportion of plasticizer(s) is 25 mol % at maximum.

11. Cast resin mixture in accordance with claim 1, wherein the cross-linking agent incorporates at least one compound which possesses at least two acrylate or methacrylate groups per molecule.

12. Cast resin mixture in accordance claim 1, characterized in that the proportion of cross-linking agent is up to 10 mol %.

13. Cast resin mixture in accordance with claim 12, characterized in that the proportion of cross-linking agent(s) is 5 mol % at maximum.

14. Cast resin mixture in accordance with claim 1, characterized in that the polymerization initiator proportion is 0.01 to 0.5 mol %.

15. Cast resin mixture in accordance with claim 14, characterized in that the polymerization initiator proportion is 0.02 to 0.15 mol %.

16. Cast resin mixture in accordance with claim 1, characterized in that said polymerization initiator is capable of initiating UV curing said cast resin mixture.

17. Cast resin mixture in accordance with claim 1, wherein the polymerization initiator is selected from the group consisting of hydroxycyclohexylphenylketone, 2-hydroxy-2-methyl-phenyl-1-propanone, 2,4,6-trimethylbenzoyldiphenyl phosphine oxide and ethyl-2,4,6-trimethylbenzoylphenylphosphinate.

18. Cast resin mixture in accordance claim 1, characterized by a proportion of at least one primer of up to 5.00 mol %.

19. Cast resin mixture in accordance with claim 17, characterized in that the proportion of the primer is up to 2.00 mol %.

20. Cast resin mixture in accordance with claim 18, characterized in that the primer is a silane.

21. Cast resin in accordance with claim 20, characterized in that vinyl-tris(2-methoxy-ethoxy) silane, 3-acryloxypropyl-trimethoxysilane or 3-methacryloxypropyl-trimethoxysilane is used as silane.

22. A method of forming an ion conducting layer of an electrochromic pane arrangement or the like, which comprises utilizing a cast resin mixture comprising at least one non-functionalized acrylic and/or methacrylic ester and at least one functionalized alkyl ester of (meth)acrylic acid, at least one plasticizer, optionally at least one cross-linking agent, optionally at least one primer and optionally at least one polymerization initiator, wherein said acrylic and/or methacrylic ester comprises at least one branched or unbranched saturated aliphatic (meth) acrylic ester, said functionalized alkyl ester of acrylic or methacrylic acid in the ester group comprises at least one hydroxy-, amino-and/or epoxy-group, wherein the alkyl chains are saturated branched or saturated unbranched, and wherein said plasticizer is selected from the group consisting of propylene carbonate, ethylene carbonate, γ-butyrolactone, 1,3-dimethyl-2-imidazolidinone, 3-methyl-2-oxazolidinone, dimethylformamide, dimethyl sulphoxide, dimethoxyethane, diethylene glycol monomethylether, and a mixture of at least two of said plasticizers.

23. Cast resin mixture in accordance with claim 1, wherein said branched or unbranched saturated aliphatic (meth)acrylic ester is selected from the group consisting of methyl-, ethyl-, n-propyl-, iso-propyl-, n-butyl-, iso-butyl-, sec-butyl-, tert-butyl- and 2-ethyl-1-hexyl (meth)acrylic esters.

24. Cast resin mixture in accordance with claim 1, wherein said compound which possesses at least two acrylate or methacrylate groups per molecule is selected from the group consisting of 1,4-butanediol diacrylate, 1,6-hexanediol diacrylate, ethylene glycol diacrylate, diethylene glycol diacrylate, tri-ethylene glycol diacrylate, propylene glycol diacrylate, dipropylene glycol diacrylate, tri-propylene glycol diacrylate trimethylol propane triacrylate, ditrimethylol propane tetraacrylate, dipentaerythritol pentaacrylate and/or pentaerythritol tetraacrylate.

25. Cast resin mixture in accordance with claim 1, wherein the branched or unbranched saturated aliphatic (meth)acrylic ester is selected from the group consisting of methyl-, ethyl-, n-propyl-, iso-propyl-, n-butyl-, iso-butyl-, sec-butyl-, tert-butyl- and 2-ethyl-1-hexyl-(meth)acrylic esters.

* * * * *